United States Patent Office 3,812,073
Patented May 21, 1974

3,812,073
PROCESS FOR PRODUCING VINYL CHLORIDE RESIN
Ikoh Ito, Takeshi Sekihara, Tomoyuki Emura, and Takeshi Ueda, Niihama, Japan, assignors to Sumitomo Chemical Company, Limited, Osaka, Japan
No Drawing. Filed Feb. 20, 1973, Ser. No. 333,661
Claims priority, application Japan, Mar. 2, 1972, 47/21,780, 47/21,781
Int. Cl. C08f 45/32, 47/00
U.S. Cl. 260—30.4 R                              9 Claims

ABSTRACT OF THE DISCLOSURE

An antistatic vinyl chloride resin is produced by subjecting vinyl chloride, or a mixture thereof with a minor amount of ethylenically unsaturated monomers copolymerizable therewith, to an aqueous suspension polymerization in the presence of 1 to 5% by weight, based on the weight of said monomer or the mixture thereof, of a monoglyceride represented by the general formula,

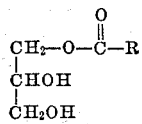

wherein R is a saturated or unsaturated hydrocarbon residue having 13 to 19 carbon atoms, or 1 to 5% by weight of the said monoglyceride and 0.01 to 5% by weight of a plasticizer, based on the said monomer or the mixture thereof. The vinyl chloride resin thus obtained is excellent in processability and thermal stability.

---

This invention relates to a process for producing an antistatic vinyl chloride resin with excellent processability and thermal stability. More particularly, the invention pertains to a process for producing antistatic vinyl chloride resin with excellent processability and thermal stability which comprises subjecting vinyl chloride, or a mixture thereof with a minor proportion of an ethylenically unsaturated monomers copolymerizable therewith, to aqueous suspension polymerization in the presence of a monoglyceride or monoglyceride and a plasticizer. A vinyl chloride resin is excellent in electric resistivity but have such drawback, at the same time, as to be statically charged with ease and hence bring about causes for various inconveniences.

For the production of a vinyl chloride resin with excellent processability, there has heretofore been proposed a process in which a combination of protective colloid with anionic surfactant is used as a suspension stabilizer. This process, however, has such disadvantage that the resulting vinyl chloride resin is extremely poor in thermal stability because the anionic surfactant remains in the resin and also insufficient in antistatc property because the amount of anionic surfactant is rather low. In view of the above, the present inventors made extensive efforts with an aim to establish a process for producing an antistatic vinyl chloride resin which is excellent in both processability and thermal stability. As the result, the inventors have found that a vinyl chloride resin which is not only fair in antistatic property but also excellent in processability, thermal stability and clarity can be produced by subjecting vinyl chloride, or a mixture thereof with a minor proportion of an ethylenically unsaturated monomers copolymerizable therewith, to aqueous suspension polymerziation in the presence of a monoglyceride or a monoglyceride and a plasticizer. On the basis of the above finding, the inventors have accomplished the present invention.

On the other hand, a process for producing spherical and uniform polymer particles by subjecting 100 parts by weight of vinyl chloride to aqueous suspension polymerization in the presence of 0.3 part by weight of the monoglyceride used in the present invention is well known according to Japanese Patent Publication No. 5,740/56. However, the said Japanese patent publication is directed only to the case where the polymer particles are regulated by using the monoglyceride as an auxiliary suspending agent, and is entirely silent on what effect is displayed in the case where the monoglyceride is used in a large amount. Thus, the above-mentioned Japanese patent publication does not even suggest such that found by the present inventors that a vinyl chloride resin which is fair in antistatic property and excellent in processability, thermal stability and clarity can be produced by making a large amount of the monoglyceride or a monoglyceride and a plasticizer present in the polymerization system.

An object of the present invention is to provide a process for producing an antistatic vinyl chloride resin with excellent processability and thermal stability, characterized by subjecting vinyl chloride monomer, or a mixture thereof with a minor proportion of an ethylenically unsaturated monomers copolymerizable therewith, to aqueous suspension polymerization in the presence of 1 to 5% by weight, based on the weight of said monomer or the mixture thereof, of a monoglyceride represented by the general formula,

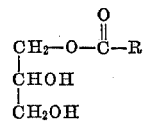

wherein R is a saturated or unsaturated hydrocarbon residue having 13 to 19 carbon atoms, or 1 to 5% by weight of the said monoglyceride and 0.01–5% by weight of a plasticizer based on the said monomer or the mixture thereof.

The process of the present invention is explained in more detail below.

Examples of the monoglyceride used in the present invention include α-monomyristin, α-monopalmitin, α-monostearin, α-monoolein and α-monoarachin. These may be used either singly or in the form of a mixture. In case the hydrocarbon residue in the monoglyceride is one having 12 or less carbon atoms, the glycerides shows higher affinity to aqueous phase with the result that the resulting polymer particles becomes irregular in shape, while in case the said hydrocarbon residue is one having 20 or more carbon atoms, the effect of improving antistatic property to the resin becomes undesirably poor.

In practicing the process of the present invention, it is an essential condition to make the monoglyceride present in the polymerization system. This is because if the monoglyceride is added later at the time of blending of the resulting vinyl chloride resin with other additives, no improvement on processability can be attained at all. Moreover, in case the monoglyceride is added at the time of blending in such a large amount as in the present invention, the homogeneous mixing of the said glyceride with the vinyl chloride resin becomes difficult with the result that it becomes impossible to improve high thermal stability and antistatic property. The amount of the monoglyceride to be added in the polymerization system is 1 to 5% by weight, preferably 1 to 3.5% by weight, based on the weight of the feed monomers. In case the amount of the glyceride made present in the polymerization system is less than 1% by weight, no significant improvement on processability, thermal stability and no significant effect on antistatic property are observed, while in case the amount of the said glyceride is more than 5% by weight, the resulting polymer particles undesirably becomes irregular and coarse and thus causes inconvenience on processing.

Further, according to the present invention, it is possible to use a plasticizer in combination with the said glyceride in polymerization system. This combination use results in such advantages that the effectiveness of the glyceride becomes greater and consequently, the quantity of the glyceride to be added in polymerization can be reduced and finally the clarity of molded articles from the resulting resin can be improved.

The amount of a plasticizer added in polymerization system is 0.01 to 5% by weight, preferably 0.05 to 3% by weight based on the weight of the feed monomers. If the amount of plasticizer combined with the glyceride is less than 0.01% by weight, the effect of improvement on antistatic property and clarity remains insufficient, while if the amount of plasticizer is larger than 5% by weight, the resulting polymer particles become undesirably coarse and besides the softening point of molded articles made from the thus obtained resin is decreased.

Examples of the plasticizer used in the present invention are plasticizers including organopolybasic acid polyesters such as dibutyl phthalate, diheptyl phthalate, dioctyl phthalate, didecyl phthalate, ditridecyl phthalate, dibutylbenzyl phthalate, trioctyl trimellitate, dioctyl adipate, didecyl adipate, dioctyl azelate and dioctyl sebacate; phosphoric acid triesters such as trioctyl phosphate, and tricresyl phosphate; fatty acid esters such as butyl stearate and butyl oleate; epoxidized soybean oil and chlorinated paraffin. These may be used either singly or in the form of a mixture.

The present invention is carried out according to the known aqueous suspension polymerization process. Preferable examples of the suspending agent used in this case include natural high molecular substances such as starch and gelatin, and synthetic high molecular substances such as partially saponified polyvinyl alcohol, methyl cellulose, ethyl cellulose, hydroxypropoxymethyl cellulose, maleic anhydride-vinyl ether copolymer and polyvinyl pyrrolidine and the like. Generally, the said suspension stabilizer is used in an amount of about 0.01 to 1% by weight based on the weight of the feed vinyl chloride monomer or the mixture thereof.

Examples of the catalyst used in the suspension polymerization include organic peroxides such as benzoyl peroxide, lauroyl peroxide and diisopropyl peroxydicarbonate; azo compounds such as azobisisobutyronitrile; and the like oil-soluble catalysts. Generally, the catalyst is used in an amount of about 0.005 to 0.5% by weight based on the weight of the feed vinyl chloride monomer or the mixture thereof. The polymerization reaction is conducted within the temperature range from 30° to 70° C., in general.

Examples of the ethylenically unsaturated monomers copolymerizable with vinyl chloride which is used in the present invention include α-olefins such as ethylene and propylene, vinyl halides other than vinyl chloride, vinylidene halides, vinyl ethers, vinyl esters such as vinyl acetate, and esters of acrylic and methacrylic acids.

Vinyl chloride resin thus produced in the above mentioned process can be favorably used for producing not only rigid polyvinyl chloride molded articles but also flexible ones.

According to the present process in which vinyl chloride or a mixture thereof monomer is subjected to aqueous suspension polymerization in the presence of a monoglyceride in such a large amount as 1 to 5% by weight or 1 to 5% by weight of monoglyceride and 0.01 to 5% by weight of a plasticizer based on the weight of said monomers, it is possible to attain such marked effects as mentioned below.

That is, the present invention gives such marked effect that a vinyl chloride resin obtained according to the present process is shortened in gelation time and can be increased in processing speed, so that the productivity can be enhanced. This effect is considered ascribable to the facts that when a monoglyceride is made present in the polymerization system, like in the present invention, the said glyceride is dispersed in molecular units in the resulting vinyl chloride resin, with the result that the glyceride is uniformly melted at the time of processing of the resin to promote the gelation thereof. Moreover, the vinyl chloride resin obtained according to the present process has an excellent antistatic property. If the monoglyceride is used in such a small amount as in the aforesaid known process, no substantial antistatic effect is observed. Even if the said glyceride is added as a lubricant at the time of blending, no antistatic effect is displayed. Thus, it is surprising that according to the present process, the glyceride displays its antistatic effect to a practically useful extent. Further, the invention has such effect as to give a vinyl chloride resin with excellent thermal stability and clarity, especially in case of combination use of the glyceride and a plasticizer. Further, the combination use of a plasticizer with the said glyceride emphasizes antistatic effect revived by glyceride. Particularly, the vinyl chloride resin obtained according to the present process has such effect as to impart an antistatic property to a polyvinyl chloride molded articles made from rigid formulation to which it has been very difficult to render antistatic property hitherto.

Test methods and conditions adopted in the present invention are shown below.

PROCESSABILITY 60 grams of a resin compound is kneaded at a rate of 30 r.p.m. at 170° C. in Plasti-Corder, Model PL V 151, with roller head, which is manufactured by Brabender Co. of West Germany, and the time required until the torque of kneading reaches to the maximum values was defined as the gelation time of the resin. This gelation time is regarded as a measure of the processability of the resin.

TRANSPARENCY

A resin sample was molded by roll and press into a sheet of 5 mm. in thickness, and then transparency of the sheet was measured according to the test method in JIS K–6714.

SURFACE RESISTIVITY

To a sheet sample of 40 mm. x 40 mm. x 1 mm. in size was applied a voltage of 500 v. by use of Insulation Resistivity Tester, Model SM–10 (manufactured by Toa Denpa Kogyo Co.) under standard conditions of a temperature of 20° C. and a relative humidity of 65%. After 1 minute, the surface resistivity value of the sheet was measured. This value is deemed as the surface resistivity of the resin.

HALF-VALUE PERIOD

To a sheet sample was applied a voltage of 10,000 v. by use of Rotary Static Honestometer (manufactured by Shishido Co.) under the above-mentioned standard conditions. After the application of voltage was stopped, the time required to decrease the voltage to one-half value of the initial was measured. Thus, measured time was regarded as the degree of easiness of electric discharge.

THERMAL STABILITY

A sample sheet was made by means of roll and press, and the resulting sheet was aged in a Geer's oven maintained at 180° C. and the time required for the sheet to turn black was measured. The thus measured time is a measure of the thermal stability of the resin.

The present invention is illustrated in more detail below with reference to examples, in which all parts are by weight.

EXAMPLE 1

A mixture comprising 150 parts of a demineralized water, 0.1 part of partially saponified polyvinyl alcohol having a saponification degree of 80 mole percent, 0.05 part of lauroyl peroxide, such amount as shown in Table 1 of α-monostearin, and 100 parts of vinyl chloride monomer were charged into a glass-lined autoclave equipped with agitator and baffle and polymerized at 64° C. The pressure at the time of initiation of the polymerization was 10.5 kg./cm.$^2$ G. When the polymerization pressure decreased to 7.5 kg./cm.$^2$ G, the polymerization was discontinued and the product was dehydrated and dried to obtain a vinyl chloride resin having an average polymerization degree of 800, yield 80%.

100 parts of the thus obtained vinyl chloride resin was blended with 1 part of a calcium-zinc complex stabilizer, 2 parts of epoxidized soybean oil and 1 part of stearic acid, and was then measured in processability by use of a plastograph. Further, the vinyl chloride resin compound was rolled at 160° C. for 5 minutes and pressed at 160° C. for 5 minutes to form a sheet of 1 mm. in thickness, which was then provided to antistatic property and thermal stability. The results obtained are as set forth in Table 1.

TABLE 1

| Run No. | Amount of α-monostearin (percent based on the weight of monomer) | Processability; gelation time (min.) | Antistatic property Surface resistivity (Ω) | Antistatic property Half-value period (sec.) | Thermal stability (min.) | Remarks: Shape of particles of vinyl chloride resin |
|---|---|---|---|---|---|---|
| 1 | 0 | 5.0 | 3.4×10$^{15}$ | >300 | 20 | Favorable. |
| 2 | 0.3 | 5.0 | 5.7×10$^{14}$ | >300 | 25 | Do. |
| 3 | 1.2 | 3.0 | 2.1×10$^{11}$ | 12 | 40 | Do. |
| 4 | 3.0 | 2.5 | 1.3×10$^{11}$ | 3 | 45 | Do. |
| 5 | 8.0 | 2.0 | 3.8×10$^{10}$ | 1 | 60 | Coarse particles of more than 42 mesh. |
| 6 | [1] 1.5 | 7.0 | 7.5×10$^{12}$ | 30 | 30 | Favorable. |

[1] 1.5 parts of α-monostearin was added not at the time of polymerization but at the time of blending.

As is clear from Table 1, the vinyl chloride resins of Run Nos. 3 and 4, which were obtained according to the present process, are markedly excellent in processability, antistatic property and thermal stability. On the other hand, the vinyl chloride resin of Run No. 1, to which no α-monostearin was added, and the vinyl chloride resin of Run No. 2, to which insufficient in amount of α-monostearin was added are inferior in all of processability, thermal stability and antistatic property. The vinyl chloride resin of Run No. 5, to which α-monostearin was added in a larger amount than that restricted in the present invention, is composed mainly of coarse particles of more than 42 mesh and hence is not suitable for processing. Further, the vinyl chloride resin of Run No. 6, to which α-monostearin was added not at the time of polymerization but at the time of blending, is inferior in antistatic property and thermal stability and is markedly inferior in processability.

EXAMPLE 2

The same polymerization as in Example 1 was effected, except that the α-monostearin was replaced by each of the monoglyceride shown in Table 2, to obtain a vinyl chloride resin having an average polymerization degree of 800, yield 80%.

Each vinyl chloride resin thus obtained was treated in the same manner as mentioned in Example 1 to form a sheet, and to measure processability, antistatic property and thermal stability. The results obtained are as set forth in Table 2.

TABLE 2

| Run No. | Monoglyceride Kind | Monoglyceride Amount (percent based on the weight of monomer) | Processability; gelation time (min.) | Antistatic property Surface resistivity (Ω) | Antistatic property Half-value period (sec.) | Thermal stability (min.) | Remarks: Shape of particles of vinyl chloride resin |
|---|---|---|---|---|---|---|---|
| 7 | α-Monopalmitin | 3.0 | 2.5 | 1.1×10$^{11}$ | 2 | 50 | Favorable. |
| 8 | α-Monoolein | 3.0 | 3.0 | 2.7×10$^{11}$ | 5 | 45 | Do. |
| 9 | α-Monoarachin | 3.0 | 3.0 | 4.3×10$^{11}$ | 6 | 50 | Do. |

As is clear from Table 2, vinyl chloride resin with excellent processabiilty, antistatic property and thermal stability can be obtained by adding every kind of the monoglyceride within the scope of the present invention to vinyl chloride at the time of polymerization.

EXAMPLE 3

A mixture comprising 150 parts of demineralized water, 0.1 part of partially saponified polyvinyl alcohol having a saponification degree of 80 mole percent, 0.05 part of lauroyl peroxide, such amounts as shown in Table 3 of α-monostearin and di-2-ethylhexyl phthalate, and 100 parts of vinyl chloride monomer were charged in a glass-lined autoclave equipped agitator and baffle and was polymerized at 64° C. The pressure at the time of initiation of the polymerization was 10.5 kg./cm.$^2$ G. When the polymerization pressure decreased to 7.5 kg./cm.$^2$ G after 12 hours, the polymerization was discontinued and the product was dehydrated and dried to obtain a vinyl chloride resin having an average polymerization degree of 800, yield 80%.

100 parts of the thus obtained vinyl chloride resin was blended with 3 parts of dibutyltin mercaptide, 0.7 part of fatty acid amide and 0.3 part of stearic acid, and was then measured in processabiilty by use of a plastograph. Further, the vinyl chloride resin compound was rolled at 160° C. for 5 minutes and pressed at 170° C. for 10 minutes to form a sheet of 5 mm. in thickness, which was then measured in transparency, antistatic property and thermal stability. The results obtained are as set forth in Table 3.

plasticizers within the scope of the present invention to vinyl chloride at the time of polymerization.

TABLE 3

| Run No. | Amounts of additives (percent based on the weight of monomer) | | Process-ability: gelation time (min.) | Transparency, percent | | Antistatic property | | | Thermal stability (min.) |
|---|---|---|---|---|---|---|---|---|---|
| | α-Mono-stearin | Di-2-ethylhexyl phthalate | | Transmission | Haze | Surface resistivity (Ω) | Half-value period (sec.) | | |
| 10 | | | 8.0 | 93.0 | 3.1 | >1×10¹³ | >300 | | 30 |
| 11 | 2.4 | | 2.5 | 87.0 | 15.7 | 3.1×10¹⁰ | 3 | | 60 |
| 12 | | 0.8 | 0.6 | 92.8 | 3.3 | >1×10¹³ | >300 | | 30 |
| 13 | 0.8 | 0.8 | 2.5 | 92.8 | 3.2 | 5.1×10¹⁰ | 3 | | 50 |
| 14 | 1.6 | 0.16 | 2.5 | 91.7 | 3.8 | 4.5×10¹⁰ | 2 | | 60 |
| 15 | 1.6 | 8.0 | 2.0 | 91.9 | 3.6 | 3.3×10¹⁰ | 2 | | 60 |
| 16 | 1.6 | | | | | | | | |
| 17 | 1.6 | ¹(1.0) | 2.5 | 89.7 | 8.7 | 4.3×10¹¹ | 30 | | 50 |
| 18 | ¹(2.0) | 0.8 | 7.0 | 89.1 | 9.1 | 8.1×10¹¹ | 40 | | 45 |

¹ The numeral in the parenthesis shows the amount of additive added at the time of blending to the resulting vinyl chloride resin with other additives (percent by weight based on the weight of the vinyl chloride resin).

As is clear from Table 3, the vinyl chloride resins of Run Nos. 13, 14 and 15 which were obtained according to the present process, are markedly excellent in all of processability, transparency, antistatic property and thermal stability. On the other hand, the vinyl chloride resin of Run No. 11, to which α-monostearin was added at the time of polymerization but no plasticizer was added, and the vinyl chloride resin of Run No. 17, to which the plasticizer was added at the time of blending of the resin, are inferior in transparency. The vinyl chloride resins of Run Nos. 10 and 12, to which no α-monostearin was added at the time of polymerization, and the vinyl chloride resin of Run No. 18, to which α-monostearin was added at the time of blending of the resin, are markedly low in processability and antistatic property. Further, the vinyl chloride resin of Run No. 16, to which the plasticizer was added in an amount larger than that regulate in the present invention, is composed of markedly coarse particles and is inferior in processability.

EXAMPLE 4

The same polymerization as in Example 3 was effected, except that the α-monostearin and di-2-ethylhexyl phthalate were replaced, respectively, by such monoglyceride and plasticizer as shown in Table 3, to obtain a vinyl chloride resin having an average polymerization degree of 800, yield 80%. Each vinyl chloride resin thus obtained, was formed into a sheet in the same manner as in Example 3, and was measured in transparency and antistatic property. Each resin was excellent in processability and thermal stability. The results of measurements are as set forth in Table 4.

What we claim is:
1. A process for producing an antistatic vinyl chloride resin with excellent transparency, processability and thermal stability, characterized by subjecting vinyl chloride, or a mixture thereof with a minor proportion of ethylenically unsaturated monomers copolymerizable therewith, to an aqueous suspension polymerization in the presence of 1 to 5% by weight, based on the weight of said monomer or the mixture thereof, of a monoglyceride represented by the general formula,

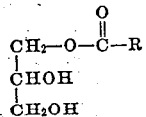

wherein R is a saturated or unsaturated hydrocarbon residue having 13 to 19 carbon atoms and a plasticizer.
2. A process according to claim 1, wherein the monoglyceride is one member selected from the group consisting of α-monomyristin, α-monopalmitin, α-monostearin, α-monoolein and α-monoarachin.
3. A process according to claim 1, wherein the amount of the monoglyceride added in the polymerization system is 1 to 3.5% by weight based on the weight of the feed monomers.
4. A process according to claim 1, wherein the plasticizer is at least one member selected from the group consisting of organopolybasic acid polyesters, phosphoric acid triesters, fatty acid esters, epoxidized soybean oil and chlorinated paraffin.
5. A process according to claim 4, wherein the organopolybasic acid polyesters are dibutyl phthalate, diheptyl

TABLE 4

| Run No. | Kinds and amounts of additives (percent based on the weight of monomer) | | | | Transparency, percent | | Antistatic property | |
|---|---|---|---|---|---|---|---|---|
| | Monoglyceride | | Plasticizer | | | | Surface resistivity (Ω) | Half-value period (sec.) |
| | Kind | Amount | Kind | Amount | Transmission | Haze | | |
| 11 | α-Monopalmitin | 2.4 | Diheptyl phthalate | 0.8 | 91.7 | 3.3 | 4.0×10¹⁰ | 3 |
| 12 | do | 2.4 | Diisodecylphthalate | 0.8 | 91.4 | 3.5 | 3.3×10¹⁰ | 2 |
| 13 | do | 2.4 | Ditridecylphthalate | 0.8 | 91.2 | 4.1 | 5.1×10¹⁰ | 2 |
| 14 | do | 2.4 | Di-2-ethylhexyl adipate | 0.8 | 92.7 | 3.8 | 2.7×10¹⁰ | 3 |
| 15 | do | 2.4 | Adecacizer-O-130 P¹ | 0.8 | 91.9 | 5.2 | 4.5×10¹⁰ | 3 |
| 16 | α-Monoarachin | 2.4 | Dibutylphthalate | 0.8 | 91.8 | 3.2 | 2.1×10¹⁰ | 2 |
| 17 | do | 2.4 | Butylbenzyl phthalate | 0.8 | 91.8 | 3.3 | 2.8×10¹⁰ | 3 |
| 18 | do | 2.4 | Tricresyl phosphate | 0.8 | 90.4 | 4.8 | 3.4×10¹⁰ | 2 |
| 19 | do | 2.4 | Enpara-40² | 0.8 | 90.2 | 5.7 | 5.6×10¹⁰ | 4 |
| 20 | do | 2.4 | Butyl oleate | 0.8 | 90.0 | 5.0 | 2.9×10¹⁰ | 2 |

¹ Epoxidized soybean oil produced by Adeca Argas Chemical Co.
² Chlorinated paraffin produced by Sankosha.

As is clear from Table 4, vinyl chloride resin with excellent all of processability, transparency, antistatic property and thermal stability can be obtained according to the present process by adding the monoglyceride and phthalate, dioctyl phthalate, didecyl phthalate, ditridecyl phthalate, dibutylbenzyl phthalate, trioctyl trimellitate, dioctyl adipate, didecyl adipate, dioctyl azelate and dioctyl sebacate.

6. A process according to claim 4, wherein the phosphoric acid triesters are trioctyl phosphate and tricresyl phosphate.

7. A process according to claim 4, wherein the fatty acid esters are butyl stearate and butyl oleate.

8. A process according to claim 1, wherein the amount of the plasticizer added in the polymerization system is 0.01 to 5% by weight based on the weight of the feed monomers.

9. A process according to claim 1, wherein the amount of the plasticizer added in the polymerization system is 0.05 to 3% by weight based on the weight of the feed monomers.

References Cited

UNITED STATES PATENTS

| 2,890,199 | 6/1959 | McNulty et al. | 260—847 |
| 3,716,505 | 2/1973 | Ohe et al. | 260—34.2 |

FOREIGN PATENTS

| 841,172 | 7/1960 | Great Britain. |
| 810,385 | 3/1959 | Great Britain. |

OTHER REFERENCES

Chemical Abstracts, vol. 55:27984e.

PVC Technology, W. S. Penn, 1966, p. 189 relied on.

MORRIS LIEBMAN, Primary Examiner

S. L. FOX, Assistant Examiner

U.S. Cl. X.R.

260—30.6 R, 31.8 R, 33.8 R, 34.2, 31.2 R